US008206544B2

(12) United States Patent
Kawai

(10) Patent No.: US 8,206,544 B2
(45) Date of Patent: Jun. 26, 2012

(54) CUTTING METHOD AND CUTTING DEVICE FOR ADHESIVE FILM

(75) Inventor: Tomohisa Kawai, Kanuma (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 656 days.

(21) Appl. No.: 11/529,501

(22) Filed: Sep. 29, 2006

(65) Prior Publication Data

US 2007/0017331 A1 Jan. 25, 2007

Related U.S. Application Data

(63) Continuation of application No. PCT/JP2005/006476, filed on Apr. 1, 2005.

(30) Foreign Application Priority Data

Apr. 1, 2004 (JP) ................................ 2004-108793

(51) Int. Cl.

*B29C 65/18* (2006.01)
*B32B 37/06* (2006.01)
*B32B 37/10* (2006.01)
*B32B 37/12* (2006.01)
*B32B 37/14* (2006.01)
*B32B 37/26* (2006.01)
*B32B 38/04* (2006.01)
*B32B 38/10* (2006.01)
*B32B 37/22* (2006.01)
*B32B 38/18* (2006.01)

(52) U.S. Cl. ........ 156/269; 156/250; 156/254; 156/510; 156/527; 156/537

(58) Field of Classification Search .................. 156/250, 156/254, 269, 510, 523, 527, 537; 83/469, 83/491–495, 663, 872
See application file for complete search history.

(56) References Cited

U.S. PATENT DOCUMENTS 4,225,374 A * 9/1980 Kaufmann .................... 156/220
(Continued)

FOREIGN PATENT DOCUMENTS

EP 1731276 A1 * 12/2006
(Continued)

OTHER PUBLICATIONS

Definition of longitudinal—http://www.merriam-webster.com/dictionary/longitudinal.*

(Continued)

*Primary Examiner* — Sonya Mazumdar
(74) *Attorney, Agent, or Firm* — Oliff & Berridge, PLC

(57) ABSTRACT

A device for ideal cutting of an adhesive film mother sheet which prevents or reduces displacement or peeling of a cover film, etc. on an adhesive layer when the adhesive film mother sheet deforms as a result of shearing forces that act during cutting. The cutting device cuts the adhesive film mother sheet into strips while performing conveyance thereof and includes a cutter mechanism and heating mechanism. The cutter mechanism may include an upper blade unit wherein a plurality of upper blades are arranged axially and a lower blade unit wherein a plurality of lower blades are arranged axially. The heating mechanism is disposed upstream of the cutter mechanism and may include a blower, a heater, a temperature sensor, and/or a temperature control unit. The blower may be connected to the heater via a an air passage and be disposed so as to blow heated air onto the adhesive film mother sheet.

2 Claims, 2 Drawing Sheets

U.S. PATENT DOCUMENTS

| | | | | |
|---|---|---|---|---|
| 4,495,124 | A | 1/1985 | Van Erden et al. | |
| 5,173,138 | A * | 12/1992 | Blauch et al. | 156/177 |
| 5,181,901 | A * | 1/1993 | Volkert | 493/331 |
| 6,245,175 | B1 * | 6/2001 | Hotta et al. | 156/172 |
| 7,727,351 | B2 * | 6/2010 | Keite-Telgenbuscher et al. | 156/247 |

FOREIGN PATENT DOCUMENTS

| | | |
|---|---|---|
| JP | 01121198 A * | 5/1989 |
| JP | A 1-121198 | 5/1989 |
| JP | A 6-210595 | 8/1994 |
| JP | A 2000-326284 | 11/2000 |
| JP | A 2003-89093 | 3/2003 |
| JP | A 2004-25395 | 1/2004 |

OTHER PUBLICATIONS

English translation of JP 06-210595 by Masuda, Toshiyuki. Aug. 2, 2004.*

European Search Report for European Application No. 05 72 7639.6, mailed Jun. 8, 2011.

* cited by examiner

PRIOR ART

CUTTING METHOD AND CUTTING DEVICE FOR ADHESIVE FILM

This application is a continuation of International Application No. PCT/JP2005/006476, filed on Apr. 1, 2005, the entire disclosure of which is incorporated herein by reference.

This application claims priority benefit of Japanese Application No. 2004-108793, filed on Apr. 1, 2004, the entire disclosure of which is incorporated herein by reference.

BACKGROUND

The present invention relates to methods and devices for cutting an adhesive film mother sheet wherein an adhesive layer is covered by a base film and a cover film. Specifically, the present invention relates to techniques for preventing or reducing the peeling of the cover film from the adhesive layer when cutting an adhesive film mother sheet while the cover film is bonded to the adhesive layer by a relatively small adhesive force.

Adhesive film, wherein both sides of an adhesive layer are covered by a base film and a cover film, is generally used when joining substrates to each other within multilayer printed circuit boards.

The process of bonding together two substrates using such an adhesive film comprises the peeling of the cover film from the adhesive layer to expose a surface of the adhesive layer and attaching one of the substrates to the exposed surface of the adhesive layer, and then peeling of the base film from the adhesive layer to expose another surface of the adhesive layer and attaching the other substrate to that exposed surface.

Treatment to ensure that the base film and the cover film can be removed by peeling is performed through the formation of a silicone film between the base film and the adhesive layer, and between the cover film and the adhesive layer. If, as described later, the adhesive force is denoted as the force required to peel the cover film or the base film respectively from the adhesive layer, then the adhesive force to the cover film is ordinarily set smaller than that of the base film so that the cover film can be more easily peeled from the adhesive layer.

Furthermore, in the process for manufacturing the adhesive film, a cutter mechanism is pressed against a long and narrow adhesive film mother sheet that is being conveyed in the longitudinal direction thereof, the adhesive film mother sheet is cut in that longitudinal direction, and adhesive films so cut to a narrow width are wound in.

As shown in FIG. 3, the cutting mechanism is, for example, configured such that an upper blade unit 11A having upper blades 11 arranged in an axial direction and a lower blade unit 12A having lower blades 12 arranged in an axial direction mutually engage. JP 2000-326284A (patent document 1) describes a slit device for improving such a cutter mechanism. In the slit device, the lateral pressure between the upper blades and the lower blades is balanced by numerically regulating the spaces between the upper blades and the spaces between the lower blades based on the relationships with the blade widths, in order to reduce the degree of warping in the adhesive films 2*a* after cutting.

As shown in FIG. 3, the adhesive film mother sheet 2 is cut as a result of sliding contact between the side surfaces of the upper blades 11 and the side surfaces of the lower blades 12. Shearing forces act on the cut surface edges of the adhesive films 2*a* formed by cutting of the adhesive film mother sheet 2 in this way, and the adhesive film 2*a* above a lower blade 12 is bent in a convex shape and the adhesive film 2*a* below an upper blade 11 is bent in a concave shape.

SUMMARY

When using the adhesive films as products, deformation of the cut surfaces caused by bending of the adhesive films 2*a* may obstruct peeling of the cover film 23; alternatively, differences in the rigidity and/or other properties of the cover film 23 and the adhesive layer 22 may result in peeling of the cover film 23 during bending of the adhesive films 2*a* or upon sliding contact between the cut surfaces of the adhesive films 2*a* and the cutter mechanism.

As substrates become increasingly narrow, the width of adhesive films 2*a* has grown smaller in recent years (for example, to a 1-mm slit width) and the above-described problems have thus become more acute. In terms of the slit width, which is now narrower, the degree of deformation of the cut surfaces and the length of peeling are growing relatively larger, decreasing production yield. These problems have not been sufficiently resolved, even when the improved technology of patent document 1 is applied; rather, although not to the same extent as the cover film 23, the base film 21 may also become more difficult to remove from the adhesive layer 22, or conversely, may peel from the adhesive layer 22 during cutting.

Therefore, it is an object of the present invention to provide a method and a device for the ideal cutting of an adhesive film mother sheet free of displacement or peeling of the cover film from the adhesive layer when the adhesive film mother sheet deforms as a result of shearing forces that act during the cutting thereof.

In order to address the above problems, exemplary embodiments of the present invention provide a cutting method for manufacturing at least two adhesive films having a small width from a long and narrow adhesive film mother sheet. The adhesive film mother sheet has a base film, an adhesive layer disposed on the base film which has an adhesive force increased by heating, and a cover film disposed on the adhesive layer. The cutting method includes pressing blades against the adhesive film mother sheet while conveying the adhesive film mother sheet in a longitudinal direction thereof, and cutting the adhesive film mother sheet in parallel with the longitudinal direction thereof. Additionally, the adhesive film mother sheet may be cut in a condition in which an adhesive force of the adhesive layer to the cover film is increased beyond the level thereof prior to cutting by heating the adhesive film mother sheet with a heating mechanism disposed upstream from a position at which the adhesive film mother sheet is cut.

Exemplary embodiments of the present invention may provide a cutting method in which the adhesive film mother sheet is heated by blowing hot air thereonto with the heating mechanism.

Exemplary embodiments of the present invention may provide a cutting method for cutting an adhesive film mother sheet in which the adhesive force of the base film to the adhesive layer is larger than an adhesive force of the cover film to the adhesive layer. The blades are heated, and the heated blades are pressed against the cover film to cut the adhesive film mother sheet.

Exemplary embodiments of the present invention may provide a cutting method in which the blades are heated by blowing hot air thereonto.

Exemplary embodiments of the present invention may provide a cutting method for cutting the adhesive film mother sheet in which the adhesive layer contains thermosetting resin and the adhesive film mother sheet is heated to less than the setting temperature of the thermosetting resin.

Exemplary embodiments of the present invention provide a cutting device for manufacturing adhesive films by cutting a long and narrow adhesive film mother sheet, the adhesive film mother sheet having a base film, an adhesive layer disposed on the base film, and a cover film disposed on the adhesive layer, using a cutting mechanism. The cutting device may include a conveyor mechanism that conveys the adhesive film mother sheet in parallel with a longitudinal direction thereof, and a heating mechanism that heats the adhesive film mother sheet.

Exemplary embodiments of the present invention may provide a cutting device in which the cutting mechanism has a lower blade unit having at least one lower blade and an upper blade unit having at least one upper blade. The lower blade unit and the upper blade unit may be disposed such that the lower blade unit engages with the upper blade unit, and the adhesive film mother sheet is conveyed to the position of engagement of the upper blade unit and the lower blade unit.

Exemplary embodiments of the present invention may provide a cutting device in which the heating mechanism has a heater that heats air and a blower that blows the air heated by the heater onto the adhesive film mother sheet.

Exemplary embodiments of the present invention may provide a cutting device in which the heating mechanism has a heater that heats air and a blower that blows the air heated by the heater either onto the upper blades or the lower blades or onto both the upper blades and the lower blades.

Exemplary embodiments of the present invention may provide a cutting device in which the heating mechanism has a temperature sensor that detects the temperature of the adhesive film mother sheet and a temperature control unit that controls the temperature of the air heated by the heater based on the temperature detected by the temperature sensor.

Exemplary embodiments of the present invention may provide a cutting device in which the heating mechanism has a temperature sensor that detects the temperature of the air blown by the blower and a temperature control unit that controls the temperature of the air heated by the heater based on the temperature detected by the temperature sensor.

Exemplary embodiments of the present invention may provide a cutting device in which the blade is shaped into a disk and the blade is rotated centering around the center of the disk so as to cut the adhesive film mother sheet.

Exemplary embodiments of the present invention may provide a cutting device including an upper blade unit having at least one upper blade, and a lower blade unit having at least one lower blade, in which each of the upper blades and each of the lower blades are shaped into a disk, the upper blades and the lower blades are configured such that the lower blade unit and the upper blade unit respectively rotate centering on the center of the disk, and are partially engaged with each other. The heating mechanism may be disposed upstream from the position of engagement of the upper blade unit and the lower blade unit in a traveling direction of the adhesive film mother sheet, so as to blow heated air onto one or both of the upper blade unit and the lower blade unit.

Exemplary embodiments of the present invention accomplish the aforementioned object by providing a cutting method for an adhesive film mother sheet, that is a method for cutting an adhesive film mother sheet while conveying the adhesive film mother sheet, in which an adhesive layer is covered by a base film and a cover film, to a plurality of blades. The adhesive forces of the adhesive layer to each of the cover film and the base film may be increased at least during the cutting of the cover film by heating the adhesive film mother sheet either upon or immediately prior to cutting thereof.

Furthermore, exemplary embodiments of the present invention accomplish the aforementioned object by (1) providing a cutting device for adhesive film mother sheet, in which, within a cutting device, an adhesive film mother sheet including an adhesive layer covered by a base film and a cover film is conveyed to a cutter mechanism having a plurality of blades and configured such that each of the blades rotates, and (2) providing a heating mechanism that heats the adhesive film mother sheet, upstream from the cutter mechanism.

By ensuring that the adhesive films are not heated downstream from the engagement point where the upper blades and the lower blades are mutually engaged and that the adhesive film mother sheet is heated temporarily only upon the cutting thereof, the adhesive films are not unnecessarily heated, and consequently, the adhesive forces and other such characteristics of the manufactured adhesive films do not change.

In the present application, the “adhesive force” is taken to correspond to the force (peeling force) required to separate the cover film or the base film respectively from the adhesive layer, and the magnitude thereof (N/cm) is measured in accordance with, for example, Japanese Industrial Standard (JIS) Z0237-1980. Furthermore, the term “heating temperature of the adhesive film mother sheet” as used in the present application is taken to mean the temperature to which the adhesive film mother sheet has been heated by a heat source.

In accordance with exemplary embodiments of the present invention, the adhesive film mother sheet is heated before cutting thereof so as to increase at least its adhesive force with respect to the cover film, and then the adhesive film mother sheet is cut. Therefore, even if the adhesive film mother sheet distorts under the influence of shearing forces acting upon it during cutting the adhesive layer distorts integrally with the cover film, enabling ideal cutting of the adhesive film mother sheet free of displacement, peeling, or the like of the cover film on the adhesive layer.

These and other objects, advantages and features are described or apparent from, the following detailed description.

BRIEF DESCRIPTION OF THE DRAWINGS

Exemplary embodiments are described below in connection with the drawings, in which like numerals represent like parts, and in which.

DETAILED DESCRIPTION OF EMBODIMENTS

A detailed description of an exemplary embodiment (that is, a first embodiment) of a cutting device for an adhesive film mother sheet and a method for cutting an adhesive film (hereinafter referred to as "the cutting device" and "the cutting method," respectively) according to the present invention is provided herein below.

There is no limitation on the adhesive film mother sheet 2 subjected to the cutting device and the cutting method of this embodiment, as long as it is a sheet having an adhesive layer 22 formed on a surface of a base film 21 and covered by a cover film 23 on a surface of the adhesive layer 22 opposite to the base film 21. The adhesive used in the formation of the adhesive layer 22 may be either a thermoplastic resin-based adhesive or a thermosetting adhesive. Further, the adhesive film mother sheet 2 may be an anisotropic conductive film wherein conductive particles have been dispersed within such an adhesive. (See FIG. 3.)

While there are no particular restrictions as to the base film 21 and the cover film 23, it is preferable that the base film 21 and the cover film 23 have an appropriate adhesive force to the adhesive layer 22, and, specifically, resin film or film with a removing agent layer can be used. More specifically, film with a removing agent layer has a resin film and a removing agent layer disposed on a surface of the resin film, and the removing agent layer contains a removing agent such as a silicone agent or fluorinated oil as the principal component thereof.

The adhesive force of each of the base film 21 and the cover film 23 can be adjusted by changing the resin film type and the removing agent type. As described above, the cover film 23 of the adhesive film 2*a* is frequently peeled from the adhesive layer 22 before the base film 21 thereof. Therefore, it is preferable that the adhesive force of the base film 21 to the adhesive layer be greater than the adhesive force of the cover film 23 to the adhesive layer.

First, the cutting device of this embodiment is described.

Figure 1:
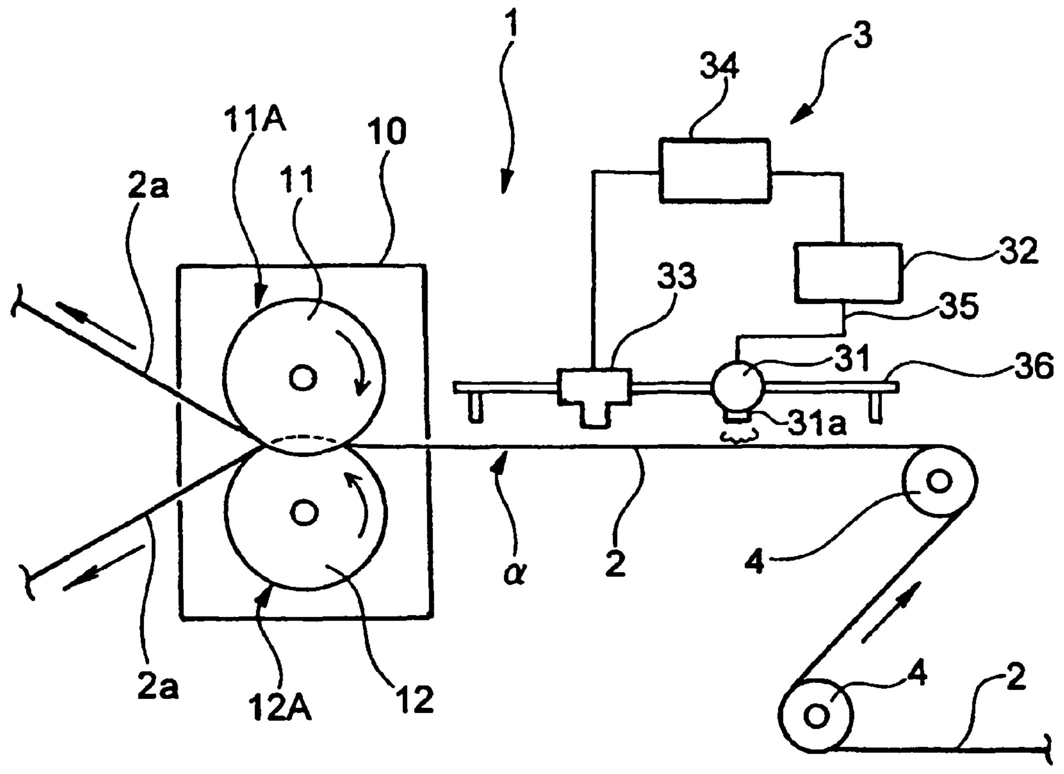
FIG. 1 is a front elevation showing a schematic configuration of a cutting device according to a first embodiment of the present invention.

FIG. 1 shows a cutting device 1 according to the present invention, the cutting device 1 having a cutter mechanism 10, a heating mechanism 3, and a conveyor mechanism.

Figure 3:
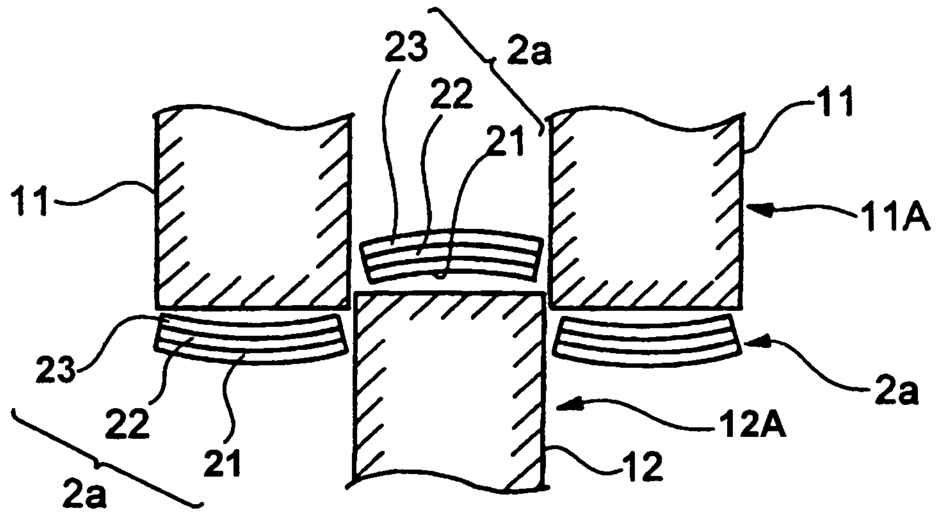
FIG. 3 is a transverse cross-section view showing an adhesive film in a deformed condition when one or more upper blades and one or more lower blades are in a state of mutual engagement.
Figure 4:
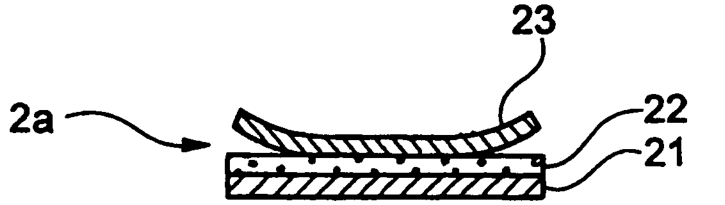
FIG. 4 is a view showing peeling of a cover film of a conventional adhesive film.

As shown in FIG. 3, the cutter mechanism 10 has an upper blade unit 11A and a lower blade unit 12A.

The upper blade unit 11A has one or more disk-shaped upper blades 11, the upper blades 11 being oriented approximately vertically and disposed in parallel with each other with a prescribed interval therebetween. (See FIG. 3.)

The lower blade unit 12A has one or more disk-shaped lower blades 12.

The thickness of each of the lower blades 12 is not more than the interval between the upper blades 11. The lower blades 12 are oriented approximately vertically and disposed in parallel with each other with an interval of not less than the thickness of each of the upper blades 11 therebetween, and the lower blade unit 12A and the upper blade unit 11A are disposed such that a lower end of an upper blade 11 enters an interval between lower blades 12, and an upper end of a lower blade 12 enters an interval between the upper blades 11. Accordingly, the upper blades 11 and the lower blades 12 are disposed such that they partially overlap and alternately engage.

A rotary shaft passes through the center of the circle of each of the upper blades 11, and another rotary shaft passes through the center of the circle of each of the lower blades 12. When the rotary shafts are rotated by a motor (not shown), each of the upper blades 11 rotates together with the corresponding rotary shaft and in the same direction as the rotary shaft, and each of the lower blades 12 rotates together with the corresponding rotary shaft in the opposite direction to that of the upper blades 11.

The conveyor mechanism has a plurality of conveyor rollers, and the adhesive film mother sheet 2 unwound from a feed roll (not shown) travels in a longitudinal direction of the adhesive film mother sheet 2 with the conveyor rollers 4.

The adhesive film mother sheet 2 travels with the conveyor rollers 4 such that, at least at engagement point where the upper blades 11 and the lower blades 12 are mutually engaged, the adhesive film mother sheet 2 travels within a plane of conveyance $\alpha$ parallel to the lower ends of the upper blades 11 and the upper ends of the lower blades 12. At the engagement point, a front surface and a rear surface of the adhesive film mother sheet 2 are respectively pressed on by the lower ends of the upper blades 11 and the upper ends of the lower blades 12; the adhesive film mother sheet 2 is simultaneously pressed down on by the upper blades 11 and pressed up on by the lower blades 12, thus the adhesive film mother sheet 2 is pulled in a vertical direction; and the base film 21, the adhesive layer 22, and the cover film 23 are cut together at an identical position, with a result that the entire adhesive film mother sheet 2 is cut.

The heating mechanism 3 that heats the adhesive film mother sheet 2 prior to cutting thereof is disposed above the adhesive film mother sheet 2 (that is, above the surface of the cover film 23 in this embodiment) and between the feed roll and the cutter mechanism, or in other words, at an upstream position closer to the feed roll than the cutter mechanism 10.

The heating mechanism 3 is provided with a blower 31, a heater 32, a temperature sensor 33, and a temperature control unit 34.

The blower 31 is connected to the heater 32 via an air passage, such as a duct 35, and when hot air heated by passing through the heater 32 passes through the duct 35 and is directed to the blower 31, the blower 31 blows the hot air from a discharge port 31*a* thereof.

The blower 31 is disposed such that the discharge port 31*a* opposes the adhesive film mother sheet 2, and that the hot air blown from the discharge port 31*a* is blown onto the adhesive film mother sheet 2 from an edge to another edge in a transverse direction of the adhesive film mother sheet 2.

The temperature control unit 34 is electrically and individually connected to the heater 32 and the temperature sensor 33. The temperature sensor 33 is configured so as to measure the temperature of the adhesive film mother sheet 2 during travel thereof between the heating mechanism 3 and the cutter mechanism 10. Accordingly, the temperature sensor 33 detects the heating temperature of the adhesive film mother sheet 2 heated by the blower 31. The temperature control unit 34 is configured such that the temperature detected by the temperature sensor 33 is converted into an electrical signal, and, based on the electrical signal, the temperature control unit 34 adjusts the electrical power delivered to the heater 32, maintaining the hot air blown from the discharge port 31*a* at a constant temperature.

The blower 31 and the temperature sensor 33 are attached to a horizontal rail 36 and configured so as to be individually capable of parallel motion forwards and backwards with respect to the cutter mechanism 10, making it possible to change settings, such as the blowing position or the blowing angle of the hot air and the position of detection of the heating temperature of the adhesive film mother sheet 2, in accordance with the width and type of the adhesive film mother sheet 2. Since the characteristics of the adhesive film mother sheet 2 may be changed by infrared light emitted by the heater 32, the heater 32 is disposed at a position sufficiently distant from the adhesive film mother sheet 2 and the adhesive films 2*a* formed by cutting thereof.

Next, the cutting method of this embodiment is described by way of illustration of a method using the above-described cutting device 1, and an operation of the cutting device 1 is also described.

As shown in FIG. 1, the uncut adhesive film mother sheet 2 is heated by the heating mechanism 3 during conveyance thereof. Within the heating mechanism 3, hot air having passed through the heater 32 is blown directly onto the adhesive film mother sheet 2 while the temperature of the heater 32 is maintained at a constant level by the temperature control unit 34. Meanwhile, the heating temperature of the adhesive film mother sheet 2 is detected and, based on the result thereof, the heater 32 is controlled such that the temperature is suitable for heating of the adhesive film mother sheet 2. The adhesive film mother sheet 2, having passing this heating mechanism 3, is uniformly heated at a constant heating temperature.

Here, the heating temperature of the adhesive film mother sheet 2 is the temperature to which the adhesive film mother sheet 2 is heated by the hot air and constitutes a parameter for quantitatively increasing the adhesive forces and opposing shearing forces acting upon cutting. This heating temperature changes in response to various factors such as the thickness of the adhesive layer 22 and the type of adhesive used therein, and the thickness of the base film 21, cover film 23, and removing agent layer. Moreover, the heating temperature cannot be uniquely specified. However, when the adhesive is a thermoplastic type of adhesive, there are no particular restrictions provided that the heating temperature is higher than room temperature (15° C.). Additionally, when the adhesive is a thermosetting type of adhesive, there are no particular restrictions provided that the heating temperature is higher than room temperature (15° C.) and does not result in hardening of the adhesive.

When heat resistance testing of a thermoplastic resin based adhesive film mother sheet 2 and a thermosetting resin based adhesive film mother sheet 2 was conducted, no variation in the characteristics of the adhesive film mother sheets 2 was identified, even when heating for 3 minutes at a temperature of 50° C. Accordingly, the characteristics of the adhesive film mother sheet 2 will be assured after heating by the heating mechanism 3 if conditions are more moderate than those of the above-described heat resistance testing, and in specific terms, the characteristics will be assured if the heating temperature of the adhesive film mother sheet 2 traveling at a speed of 1 m/min or more and 10 m/min or less is 25° C. or more and 50° C. or less.

In addition to the heating temperature, parameters for increasing the adhesive forces may also include, for example, the heating time, surface area of hot air blowing, and degree of heat radiation before cutting, and these parameters are combined as the heat transfer rate ($kJ/(m^2s)$) per unit time and unit surface.

In an adhesive film mother sheet 2 heated in this manner, the adhesive layer 22 softens and melts, while the cover film 23 and the base film 21 become pliable and the differences in the rigidity of the component layers decrease. As a result, the adhesive force to each of the cover film 23 and the base film 21 increases beyond the level thereof prior to heating. These adhesive forces will further increase if the properties of the adhesive are such that the adhesive strength thereof increases at the heating temperature.

The adhesive force to the cover film 23 or the base film 21 (hereinafter also referred to as "the cover film 23, etc." where appropriate) constitutes a parameter that can be used to oppose the shearing forces acting upon cutting and corresponds to the force required to peel the cover film 23, etc. from the adhesive layer 22. Similar to the heating temperature, these adhesive forces change according to various factors such as the thickness of the adhesive layer 22 and the type of adhesive used therein, and the thickness of the base film 21, cover film 23, and removing agent layer. Moreover, the adhesive forces cannot be uniquely specified. However, it is sufficient that the adhesive forces be forces of resistance preventing or reducing displacement, peeling, or the like of the cover film 23, etc. on the adhesive layer 22 when the adhesive film mother sheet 2 is subjected to shearing forces acting upon cutting.

Next, the heated adhesive film mother sheet 2 is conveyed to the cutter mechanism 10 and cut thereby. Within the cutter mechanism 10 in this case, the thicknesses (or widths) of the upper blades 11 and the thicknesses (or widths) of the lower blades 12 are smaller than the width of the adhesive film mother sheet 2. Additionally, the adhesive film mother sheet 2 is cut into slit widths corresponding to the widths of the upper blades 11 and lower blades 12 as a result of sliding contact between the lower ends of the upper blades 11 and the upper ends of the lower blades 12, so that a plurality of thin adhesive films 2*a* are formed. As shown in FIG. 3, shearing forces act on the cut surface edges of the adhesive film mother sheet 2 at this time, and, consequently, each portion of the adhesive film mother sheet 2 pressed up on by the upper end of a lower blade 12 bends to form a convex shaped surface and each portion of the adhesive film mother sheet 2 pressed down on by the lower end of an upper blade 11 bends to form a concave shaped surface. The base film 21 and the cover film 23 are more likely to peel from the adhesive layer 22 as a result of this distortion of the adhesive film mother sheet 2. However, because the adhesive film mother sheet 2 is heated by the heating mechanism 3 before being conveyed to the cutter mechanism 10 as described above, and the adhesive force to each of the base film 21 and the cover film 23 increases, the adhesive layer 22 distorts integrally with the base film 21 and the cover film 23 in the adhesive film mother sheet 2. Thus, the base film 21 and the cover film are prevented from displacing or peeling from the adhesive layer 22.

The adhesive films 2*a* having a small width that have been cut by the cutter mechanism 10 are individually wound in by winding rolls (not shown) and formed into rolls of adhesive film.

As described above, according to this embodiment of the present invention, since the adhesive film mother sheet 2 is heated before cutting so as to increase at least the adhesive force to the cover film 23 and then the adhesive film mother sheet is cut, even when the adhesive film mother sheet 2 distorts under the influence of shearing forces acting upon cutting, the adhesive layer 22 distorts integrally with the cover film 23, etc., as a result of the increase in the adhesive force, enabling ideal cutting of the adhesive film mother sheet 2 free of displacement, peeling, or the like of the cover film 23, etc. on the adhesive layer 22.

Furthermore, according to this embodiment, since hot air is blown directly onto the adhesive film mother sheet 2 in order to perform heating thereof, the adhesive force to the cover film 23, etc. can be increased directly without affecting the characteristics of the adhesive film mother sheet 2.

Since, in accordance with this embodiment, the heating temperature of the adhesive film mother sheet 2 is such that hardening of the adhesive layer 22 does not occur in cases where the adhesive is a thermosetting type of adhesive, the adhesive force to the cover film 23, etc. can be increased without affecting the characteristics of the adhesive film mother sheet 2, even when the adhesive film mother sheet 2 comprises anisotropic conductive film including a hardening agent.

Further, according to this embodiment, the adhesive film mother sheet 2 can be uniformly heated and uniformity can be achieved in the adhesive force to the cover film 23, etc. since the temperature of the hot air is controlled so as to be constant and is controlled so as to be appropriate based on the results of detection of the heating temperature of the adhesive film mother sheet 2.

The following is a description of another exemplary embodiment (namely, a second embodiment) of a cutting device and cutting method according to the present invention.

Figure 2:
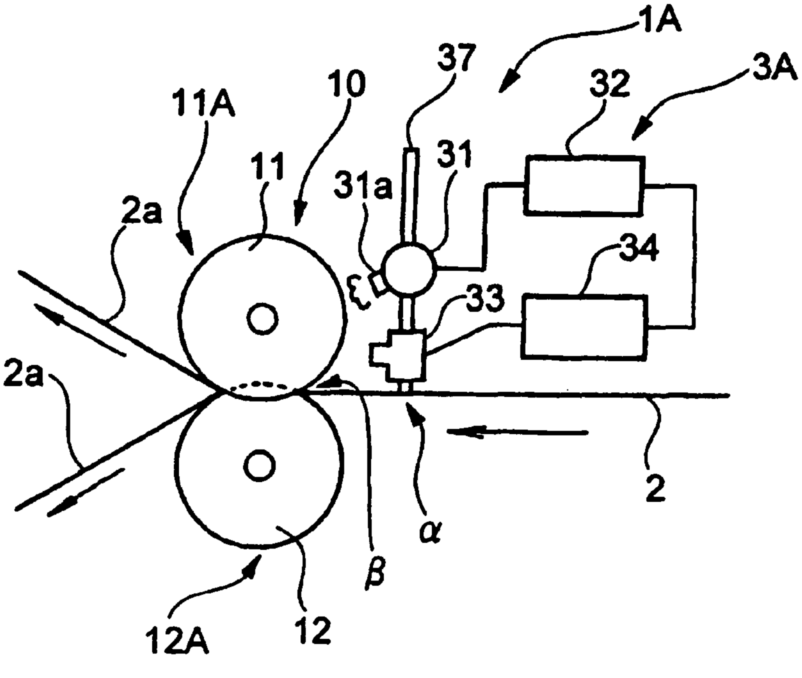
FIG. 2 is a front elevation showing a schematic configuration of a cutting device according to a second embodiment of the present invention.

As shown in FIG. 2, the cutting device 1A of this embodiment differs from the cutting device 1 of the first embodiment in terms only of the heating mechanism 3A. The heating mechanism 3A of this embodiment is a mechanism disposed upstream from the cutter mechanism 10, and while the heating mechanism 3A is similar to the heating mechanism 3 of the first embodiment in that a blower 31, a heater 32, a temperature sensor 33, and a temperature control unit 34 are provided therein, the heating mechanism 3A differs from the heating mechanism 3 in terms of the positions in which these component parts are disposed. Specifically, the blower 31 is disposed above the plane of conveyance α and the discharge port 31*a* thereof is disposed upstream from the above-described engagement point and opposing the upper blades 11 so as to traverse the upper blade unit 11A. The hot air blown onto the upper blades 11 both heats the upper blades 11 and is drawn into the upper blades 11 by the rotation thereof, raising the ambient temperature of one or more space sections (hereinafter called air-drift sections) β formed by the surface of the adhesive film mother sheet 2 immediately before being conveyed to engagement position and the side surfaces of the upper blades 11.

In this embodiment, the temperature sensor 33 is disposed below the blower 31 and in the vicinity of the air-drift sections β, so as to detect the ambient temperature of the air-drift sections β heated by the blower 31.

The blower 31 and the temperature sensor 33 are attached to a vertical rail 37 and configured so as to be individually capable of parallel motion up and down with respect to the cutting plane of the cutter mechanism 10. With the exception of the above, the cutting device 1A of this embodiment is configured identically to the cutting device 1 of the first embodiment.

Next, the cutting method of this embodiment is described by way of illustration of a method using the above-described cutting device 1A, focusing principally on differences with respect to the cutting method of the first embodiment, and the operation of the cutting device 1A is also described.

The principal difference between the cutting method of this embodiment and that of the first embodiment is that, rather than blowing hot air directly onto the adhesive film mother sheet 2, the cutting method of this embodiment blows hot air onto the upper blades 11, as shown in FIG. 2. Within the heating mechanism 3A, hot air having passed through the heater 32 is blown directly onto the upper blades 11, performing direct heating thereof, and the adhesive film mother sheet 2 is indirectly heated by both the heated upper blades 11 and the hot air having collected in the air-drift sections β, while the temperature of the heater 32 is maintained at a constant level by the temperature control unit 34. Meanwhile, the ambient temperature of the air-drift sections β is detected, and based on the result thereof, the heater 32 is controlled such that the temperature thereof is suitable for heating of the adhesive film mother sheet 2.

Although hot air is not blown directly onto the adhesive film mother sheet 2 by the heating mechanism 3A, the ambient temperature of the air-drift sections β increases as described above, and since the adhesive film mother sheet 2 is conveyed to the air-drift sections β immediately prior to cutting thereof, the adhesive film mother sheet 2 is heated uniformly at the air-drift sections β. After the adhesive film mother sheet 2 is heated at the air-drift sections β, the adhesive film mother sheet 2 is pressed on by the heated upper blades 11 and is cut.

Since the adhesive film mother sheet 2 travels within a plane of conveyance α parallel to the bottom edges of the upper blades 11 as described above, if it is assumed that the bottom edges of the upper blades 11 are flat, then the adhesive film mother sheet 2 is pressed on by the complete bottom edge of each upper blade 11. In this way, the relatively large surface area of the adhesive film mother sheet 2 is heated by the upper blades 11.

Here, the adhesive film mother sheet 2 travels with the surface thereof upon which the cover film 23 is disposed oriented upwards, and the upper blades 11 heat the surface of the adhesive film mother sheet 2 of the cover film 23 side. Although, as described above, the adhesive force to the cover film 23 is smaller than the adhesive force to the base film 21, the cover film 23 becomes difficult to peel as the heating mechanism 3A selectively heats the cover film 23 upon cutting and the corresponding adhesive force increases.

In the cutting method of this embodiment, hot air is forcibly collected in the air-drift sections β to form a hot-air space as described above, and in a such a condition wherein the minimum of supply heat of the hot air is allowed to escape, the adhesive film mother sheet 2 is efficiently heated immediately prior to cutting, and cooling thereof before cutting is prevented or reduced. Meanwhile, upon cutting, transfer of heat between the upper blades 11 and the adhesive film mother sheet 2 is kept to a minimum, preventing or reducing lowering of the heating temperature of the adhesive film mother sheet 2. With the exception of the above, the cutting method of this embodiment is identical to the cutting method of the first embodiment.

Since hot air is blown directly onto the upper blades 11, and in addition to the adhesive film mother sheet 2, the upper blades 11 are also heated, as described above, the heating temperature of the adhesive film mother sheet 2 does not drop, or else drops only very slightly, during cutting thereof, and the adhesive force to the cover film 23, etc. can be increased to a higher level than that of the first embodiment. In the adhesive film mother sheet 2 wherein the adhesive force to the cover film 23, etc. is originally set relatively low, therefore, deformation of the cut surfaces and peeling of the cover film 23, etc. during cutting can be prevented or reduced. The heating mechanism 3A may be configured so as to heat the lower blades 12 in addition to the upper blades 11, or to heat only the lower blades 12 instead of the upper blades 11. When the heating mechanism 3A heats the lower blades 12 together with the upper blades 11, it is preferable that the cutting device 1A be provided with a plurality of temperature sensors 33, and that in addition to at least one temperature sensor 33 disposed in the above air-drift section β, at least one temperature sensor 33 be disposed in the vicinity of a space section (another air-drift section) formed by the lower blades 12 and the adhesive film mother sheet 2 so that the ambient temperature of each air-drift section is detected. When the heating mechanism 3A heats only the lower blades 12, it is preferable that the temperature sensor 33 be disposed in the vicinity above another air-drift section formed by the lower blades 12 and the adhesive film mother sheet 2 so that the ambient temperature of that air-drift section is detected. While there are no particular restrictions as to the heating of the upper blades 11 and the lower blades 12 in this manner, it is preferable that, upon the cutting of the adhesive film mother sheet 2, the heated blades press on the film having the lower adhesive force, or in other words, the cover film 23.

It will be understood that the present invention will not be limited to the above-described embodiments. On the contrary, the invention is intended to cover alternatives, modifications, and substitutes. In terms, for example, of the appropriate heating of the adhesive film mother sheet in order to prevent or reduce deformation of the cut surfaces and peeling of the cover film upon cutting, although it is preferable that the heating temperature of the adhesive film mother sheet be used as a parameter for quantitatively increasing the adhesive forces, in accordance with the present invention, the temperature of the hot air, the temperature of the heated upper blades, and other factors that indirectly contribute to the heating temperature of the adhesive film mother sheet may also be used as such parameters, and adhesive force may be directly used as a parameter. When adhesive force is used as a parameter, the ratio of the post-heating adhesive force to the pre-heating adhesive force can be expressed as a rate of increase of adhesive force. Since measurement of the post-heating adhesive force is difficult in practice, simulation-based analysis may be used for determination thereof in a virtual manner.

Furthermore, although it is preferable in accordance with the present invention that hot air is blown from the side corresponding to the lower adhesive force (that is, the side of the cover film), in situations such as where the difference between the adhesive force to the cover film and the adhesive force to the base film is relatively small, hot air may be blown from the side of the base film. Additionally, in situations such as where the adhesive force to the cover film after heating is greater than the adhesive force to the base film prior to heating, hot air may be blown from both the side of the cover film and the side of the base film. There is no direct relationship between the side of the adhesive film mother sheet from which hot air is blown and the fact that the adhesive film mother sheet is conveyed with the cover film disposed on the upper side thereof. However, in some cases the relationship between the adhesive film mother sheet type and the upper and lower blades results in a sharper cut-surface shape if the adhesive film mother sheet is conveyed with the cover film disposed on the lower surface thereof. In such a case, it is preferable that the adhesive film mother sheet be conveyed with the cover film disposed on the lower surface thereof.

Although it is preferable in accordance with the present invention that hot air be blown directly onto the adhesive film mother sheet or the blades, a heater may be integrated into the blades or the conveyor rollers to heat the adhesive film mother sheet. In such a case, it is preferable that the heater does not change the characteristics of the adhesive. The heating mechanism may be provided with a heater that exposes the heating mechanism to infrared light so as to heat the blades, and, in such a case, in order to prevent the characteristics of the adhesive being changed or reduce such change, it is preferable that this heater be disposed in such a way that the adhesive film mother sheet 2 is not exposed to the infrared light. Furthermore, it is also possible to use a combination of at least two of a blower that blows hot air, a heater that irradiates infrared light, and a heater integrated into a blade or a conveyor roller.

In addition to blowing hot air directly onto the adhesive film mother sheet, in accordance with the present invention, the hot air may also be blown directly onto the blades. While the present invention has been described in terms of the exemplary embodiments, wherein the adhesive film mother sheet 2 is heated in order to increase the adhesive forces to each of the cover film 23 and the base film 21, it will be understood that the invention is not limited to these embodiments. On the contrary, provided that the adhesive forces are increased temporarily upon conveyance of the adhesive film mother sheet 2 to the engagement point, the adhesive film mother sheet 2 may, for example, be cooled.

What is claimed is:

1. A cutting method for manufacturing at least two adhesive films from an adhesive film mother sheet, the adhesive film mother sheet having a base film, an adhesive layer disposed on the base film and having a first adhesive force with the base film that increases when heated, and a cover film disposed on the adhesive layer, the cover film comprising a film and a removing agent layer formed on a surface of the film that faces the adhesive layer, wherein the first adhesive force is greater than a second adhesive force between the adhesive layer and the cover film, the method comprising:

conveying the adhesive film mother sheet;

increasing the second adhesive force between the adhesive layer and the cover film beyond a level thereof while conveying the adhesive film mother sheet and prior to cutting by heating the adhesive film mother sheet to be a temperature higher than 15° C. and lower than a thermosetting temperature of a thermosetting resin of the adhesive layer from a cover film side with a heating mechanism disposed upstream from a position at which the adhesive film mother sheet is cut; and while the second adhesive force is in the increased state, pressing blades against the adhesive film mother sheet while conveying the adhesive film mother sheet, thereby cutting the adhesive film mother sheet in parallel with a direction in which the adhesive film mother sheet is conveyed, wherein the adhesive layer is formed of an anisotropic conductive film wherein conductive particles are dispersed within an adhesive, and wherein the adhesive layer contains the thermosetting resin as the adhesive and the adhesive layer has a characteristic that when the adhesive layer is heated to be a temperature lower than the thermosetting temperature, the adhesive layer softens and its adhesive force is increased.

2. The cutting method of claim 1, wherein the adhesive film mother sheet is heated by blowing the hot air to the cover film by the heating mechanism.

* * * * *